United States Patent
Irwin, Sr. et al.

[19]

[11] Patent Number: 5,962,101
[45] Date of Patent: *Oct. 5, 1999

[54] DIMENSIONALLY STABLE TUFTED CARPET

[75] Inventors: Donald A. Irwin, Sr., 107 Azalea Cir., Dalton, Ga. 30721; Steve Linville, Flower Mound, Tex.

[73] Assignees: Donald A. Irwin, Sr.; Darwin Enterprises, Inc., both of Dalton, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 08/840,395

[22] Filed: Apr. 29, 1997

[51] Int. Cl.⁶ ........................................................ B32B 3/00
[52] U.S. Cl. ............................................... 428/92; 428/95
[58] Field of Search .......................................... 428/95, 92

[56] References Cited

U.S. PATENT DOCUMENTS

| | | | |
|---|---|---|---|
| 3,542,632 | 11/1970 | Eichoff | 428/95 |
| 4,389,434 | 6/1983 | Polman | 428/95 |
| 4,439,476 | 3/1984 | Guild | 428/96 |
| 5,380,574 | 1/1995 | Katoh et al. | 428/95 |
| 5,470,648 | 11/1995 | Pearlman et al. | 428/247 |

*Primary Examiner*—Terrel Morris
*Attorney, Agent, or Firm*—James B. Middleton; David J. Hill

[57] ABSTRACT

A carpet is tufted with a two-part primary backing. The upper, or face, backing is a conventional woven or non-woven polypropylene, and the lower, or back, backing is a stronger, open weave fabric. The tufts of yarn are sewn through both parts of the primary backing, which holds the parts together, and causes some of the back stitches to protrude for better coating with adhesive. The resulting carpet may be fully back coated, and may have a secondary backing adhered thereto. The lower backing prevents elongation, stretching and shrinking of the carpet during manufacture and subsequent processing.

10 Claims, 4 Drawing Sheets

DIMENSIONALLY STABLE TUFTED CARPET

BACKGROUND OF THE INVENTION

1. Field of the Invention

This invention relates generally to carpets and the like, and is more particularly concerned with a tufted carpet having a double primary backing for providing a dimensionally stable carpet before coating, and without application of a secondary backing.

2. Discussion of the Prior Art

In the past, tufted carpeting was made by tufting yarn into a backing of woven jute or the like. The jute backing was heavy and stable, so one coated the back with latex or other adhesive only to lock in the tufts, and the carpet was ready to install. More recently, however, various light weight materials have been used as a primary backing through which yarn is tufted, and a secondary backing of a stable material is adhered to the back of the carpet by an adhesive.

Currently, the most popular primary backings are polypropylene, either woven or non-woven materials. Such backings are preferred because: they are inexpensive; the material has an oily quality that provides for smooth entry and exit of the needles; and, the material is quite elastic so the hole tends to close around the yarn after the needle is withdrawn. However, the polypropylene has some disadvantages. Those skilled in the art will realize that polypropylene is a thermoplastic-elastomer, so the backing is subject to degradation by excess heat, and is rather easily stretched through the application of tension.

Typically, after face yarns are tufted into a primary backing, the resulting carpet is back coated with an adhesive to lock in the stitches. Without the back coating, the tufts are very easy to pull out, so the back coating is an important next step. During the coating, however, the carpet is unstable because there is only the primary backing. Thus, one experiences generally from 5 to 20% elongation of the carpet during the back coating process. While this creates more carpet, it also reduces the amount of face yarn per unit area. Furthermore, the backing may not stretch uniformly, so any pattern in the carpet will be distorted. There have been efforts at holding the pattern straight, but such efforts require additional equipment and effort, and still do not solve the basic problem of stretching of the primary backing.

The prior art includes some rugs or carpets having a plurality of backings. For example, U.S. Pat. No. 2,713,012 to Hartstein discloses a tufted rug having dual primary backings of cotton and jute or the like. The Hartstein patent does not contemplate back coating of the rug, and relies on the double backing to assist in holding in the tufts. Also, the jute backing is heavy enough to stabilize the rug. U.S. Pat. No. 4,426,415 to Avery discloses a carpet in the nature of artificial turf having a plurality of primary backings, the backings varying in fineness from bottom to top of the carpet. All of the plurality of backings are of the same material, and polypropylene is specifically mentioned. Since Avery contemplates back coating of the carpet, the problem of stretching and distorting will still be present, though perhaps slightly reduced because of the greater strength of multiple backings. U.S. Pat. No. 4,705,706 to Avery discloses a multiple primary backing, but the backing may be nylon or the like while the face yarn is polyethylene so the back stitch can be set by heat rather than by a separately applied adhesive. The multiple layers of backing, then, allow sand to infiltrate when the carpet is used as outdoor turf.

It will therefore be seen that the prior art has not provided a solution to the problem of stretching and distorting of the carpet during back coating and other treatment of the carpet.

SUMMARY OF THE INVENTION

The present invention provides a tufted carpet having a double primary backing, one part of such backing being a conventional backing of polypropylene or the like, and the other part being an open weave material having greater strength and less stretch than the conventional backing. The face yarns are tufted through both parts of the double backing, which secures the two backings together. In view of the open weave in the other part of the backing at least some of the back stitches protrude noticeably from the back of the carpet, so applied adhesive can truly encapsulate such stitches for maximum strength.

With the dual primary backing, it has been found that the tufts are held more securely, even before back coating of the carpet, so the carpet can be handled as necessary without fear of losing any substantial amount of face yarns. During back coating or other processing of the carpet, the non-stretchable backing in the carpet prevents elongation or other stretching of the carpets. As a result, the quality of the carpet, including the integrity of the pattern and the quantity of face yarns per unit area, remains consistent.

BRIEF DESCRIPTION OF THE DRAWINGS

These and other features and advantages of the present invention will become apparent from consideration of the following specification when taken in conjunction with the accompanying drawings in which.

DETAILED DESCRIPTION OF THE EMBODIMENTS

Figure 1:
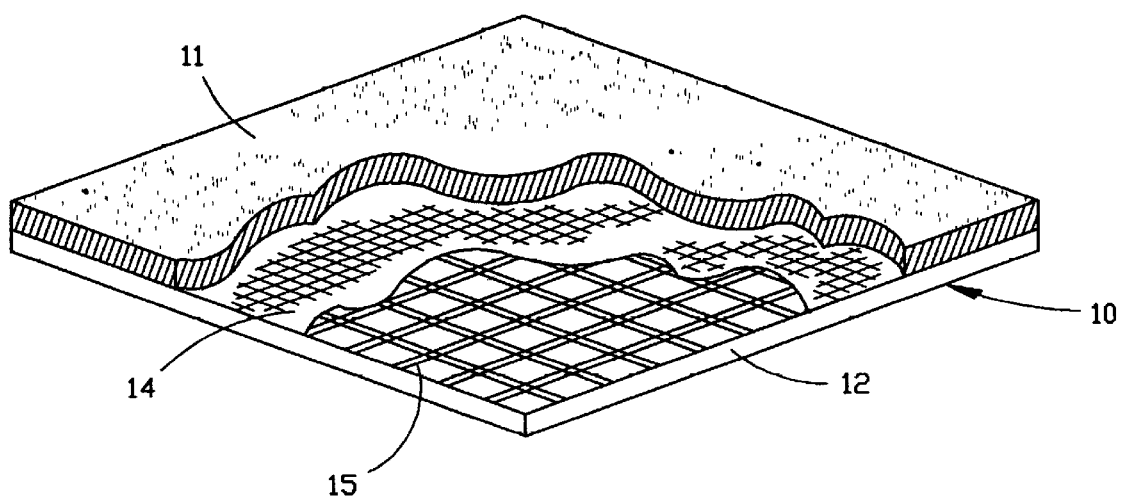
FIG. 1 is a perspective view showing a piece of carpet made in accordance with the present invention, the carpet being partially broken away to show the construction.

Referring now more particularly to the drawings, and to those embodiments of the invention here presented by way of illustration, FIG. 1 shows a piece of carpet generally designated at 10, the carpet 10 comprising face yarns 11 and a primary backing 12. The primary backing comprises an upper or first backing 14 and a lower or second backing 15. The term "upper backing" as used herein indicates the backing at the face of the carpet. Similarly, the term "lower backing" indicates the backing on the bottom when the carpet is laid.

The upper backing 14 is here indicated as a woven material, but it will be understood that it may equally well be a non-woven material. It is contemplated that the upper backing 14 will be a conventional primary backing material of polypropylene. Such backings utilize a relatively soft polypropylene so the tufting needles will penetrate easily, but such backings are inherently unstable dimensionally. Those skilled in the art will realize that the backing 14 is most often woven from polypropylene ribbons.

The lower backing 15 is here indicated as an open weave material. It is contemplated that the backing 15 may comprise a leno weave having mono-filaments or tape yarn in the warp direction, and a spun fiber in the fill direction. While this construction is not necessary, the mono-filaments or tape will yield a high degree of non-stretchability, while the spun fibers will increase adhesion between the backing 15 and the adhesive used to back coat the carpet 10.

For maximum stability of the carpet of the present invention, the lower backing 15 may be formed of fiber glass or the like; however, one can attain the objects of the invention with other materials, though with some sacrifice in stability. Thus, one might use a polypropylene lower backing 15, but the backing 15 will still be an open weave as shown, and still be a leno weave or similar construction to yield reasonable dimensional stability. Furthermore, the particular polypropylene used will preferably be a harder material having greater strength and less stretch than the soft material used in the conventional primary backing. Similarly, other materials having less stretch may be used, such as polyester or other polymeric materials. Of course the number of picks per inch in the fabric can be varied along with the particular fiber to attain the desired quality and cost.

Figure 2:
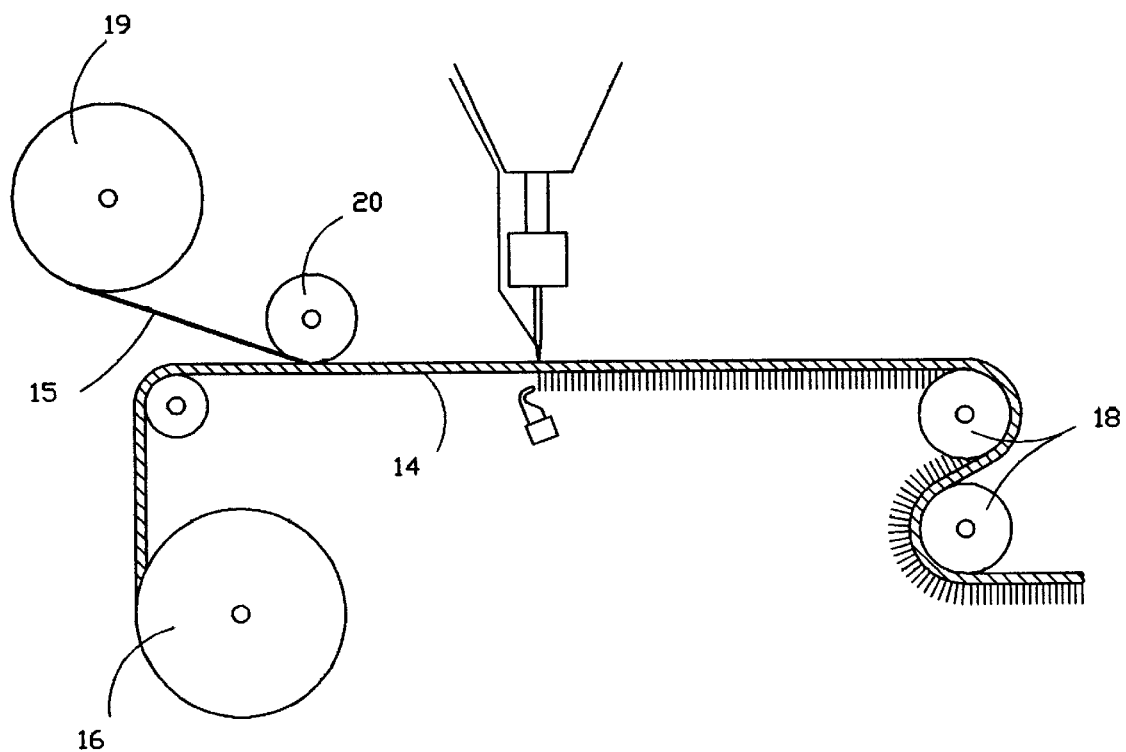
FIG. 2 is a schematic illustration showing the tufting of carpet in accordance with the present invention.

With attention directed to FIG. 2 of the drawings, it will be understood that the carpet of the present invention is tufted in a generally conventional way. The usual primary backing, the upper backing 14, is mounted on a roll 16, and passes through the tufting machine to the exit rolls 18. In accordance with the present invention, the lower part of the primary backing 15 is mounted on a roll 19, and is held against the backing 14 by a roll 20. With the two parts of the backing 12 held together, the tufting machine sews tufts of yarn through the primary backing 12. It will therefore be understood that the carpet, immediately on being tufted, has the strength and stability attributes discussed above. Those skilled in the art will realize that carpet may be stretched and distorted as it emerges from the tufting machine, but the present invention substantially eliminates such stretch and distortion.

A constant concern in the tufting process is needle deflection. If some of the needles engage fibers or the like, and some needles move laterally in attempting to penetrate, there is a danger of breaking a needle, and there is a great danger of producing deviant stitches that reduce the quality of the finished goods. Those skilled in the art have always thought that one could not tuft into a material such as the backing 15 because of needle deflection. One has used very soft polypropylene ribbons, or spun fibers, or soft non-woven polypropylene as a primary backing. In developing the carpet of the present invention, open weave fabrics of a hard polypropylene, and even fiber glass, have been tufted into without experiencing any needle deflection.

Figure 3:
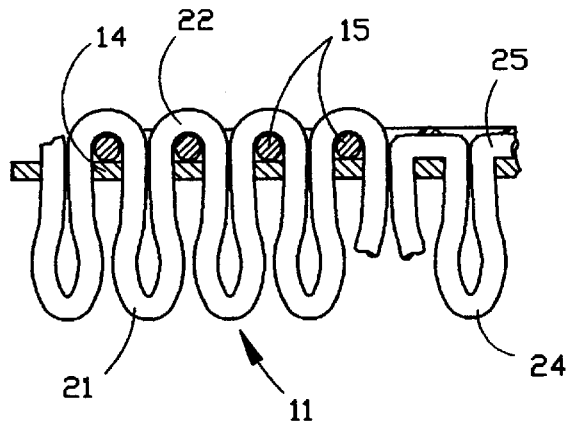
FIG. 3. is a highly enlarged cross-sectional view showing the construction of carpet made in accordance with the present invention.

For a more thorough understanding of the construction of the carpet of the present invention, attention is directed to FIG. 3 of the drawings. It will be seen that the tufts of the face yarn 11 pass through the primary backing 12. In more detail, the yarn of the tufts 21 passes through both the upper backing 14 and the lower backing 15, and the stitches making up the back stitch 22 loops over the strands of the lower backing 15.

Figure 6:
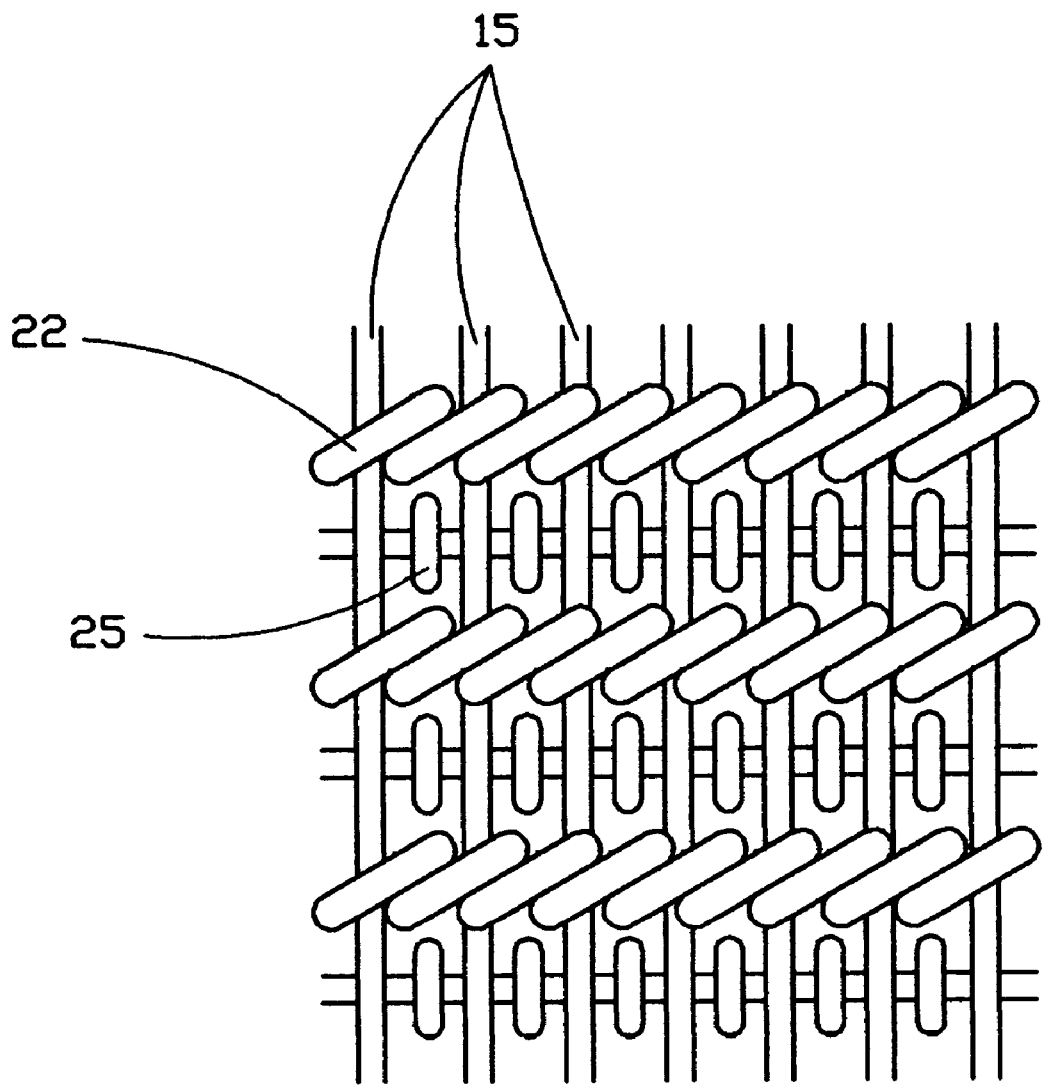

Since the backing 15 is an open weave, some of the stitches are likely to miss the strands of the backing 15 and engage only the backing 14. In FIG. 3 the yarns of the tufts 24 pass through only the upper backing 14, and the back stitches 25 lie against the lower side of the backing 15. This is further illustrated in FIG. 6 of the drawings where the back stitches 22' are shown looping over the strands of the lower backing 15, while some of the back stitches 25' are shown between the strands of the backing 15, and engaged with only the upper backing 14.

In view of the construction described above, it will be understood that the tufts of yarn are mechanically locked into the system. In the conventional tufted carpet, the tufts are, like the tuft 24, through only the soft and stretchable material 14, but without the additional fabric 15 to hold the tufts. The carpet 10, having the second primary backing 15, does not stretch or distort noticeably, but is stable even as it leaves the tufting machine.

In the above and foregoing discussion, it should be understood that the term "primary backing" indicates a sheet of material through which yarns are inserted. The term "secondary backing" indicates a sheet of material that is fixed to the back of the tufted carpet, such material not having yarns inserted therethrough.

Those skilled in the art will realize that, even with the mechanical lock for the tufts 21 and 24, it is desirable to back coat the carpet to assure that the tufts will not pull out. One form of back coating utilizes a small amount of adhesive, and the adhesive is allowed to coat the back stitch very lightly. The carpet of the present invention works well with such back coating because stitches such as the stitches 22 and 22' stand out from the backing, allowing the adhesive to coat the sides of the stitches. Many adhesives used do not actually adhere well to the fiber, but depend on simply encapsulating the stitches to prevent their pulling out. With the protruding stitches 22 and 22', the yarns can be well encapsulated for firm anchoring of the yarns.

Figure 4:
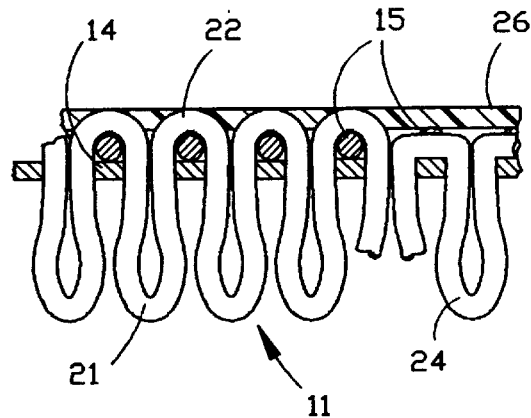
FIG. 4 is a view similar to FIG. 3, but showing an adhesive in place to lock in the stitches.

Sometimes it is preferable to back coat the carpet to provide a smooth rear surface, as shown in FIG. 4. FIG. 4 is like FIG. 3, except that there is a coating of adhesive 26. The adhesive 26 is thick enough that the entire back stitch is covered, and the back of the carpet is smooth.

Figure 5:
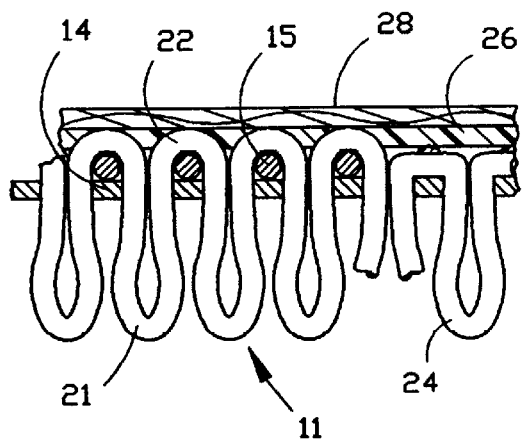
FIG. 5 is a view similar to FIG. 4 but showing a secondary backing placed over the adhesive; and, FIG. 6 is a schematic illustration showing a plan view of the back of a carpet made in accordance with the present invention.

FIG. 5 shows a modified form of the carpet shown in FIG. 4. In FIG. 5, the adhesive 26 is present, and the adhesive is also used to adhere a secondary backing 28 to the carpet. While a secondary backing will not be required on the carpet of the present invention for most uses, one may wish to use a tricot as a secondary backing for installations using hook and loop fasteners for holding carpet. In this event, the tricot secondary backing performs the function of the loop material for fastening the carpet to the floor.

The carpet as shown in FIG. 5 may have other sheet materials adhered thereto as a secondary backing. For example, one might select any of the conventional woven or non-woven materials, or a sheet of foamed material. The foamed material may be mechanically frothed and applied, may be foamed in place, or may be formed as a sheet and subsequently adhered to the carpet. All these techniques are known in the art. Further, on might use a waterproof barrier as disclosed in U.S. Pat. No. 5,612,113. Other secondary backings will suggest themselves to those skilled in the art.

The invention will be understood better from consideration of the following examples:

Example I

A carpet was tufted at 56 ounces of face yarn per square yard, with a nylon fiber having a denier of 4400. The backing comprises a 15 foot wide primary backing "Poly Bac" style 2225 from Amoco Fabric and Fibers Company, plus a layer of fiber glass, style 4802 from CCX Fiberglass Products. The tufting was performed on a 3/16 gauge tufting machine. No shrinkage was observed in this example, but a two- to three-inch shrinkage was observed without the layer of fiber glass.

The tufted carpet described above was back coated with a polyurethane having the following formulation:

| Ingredient | Parts/Hundred |
|---|---|
| Arco Chemical Froth Polyol | 92. |
| Diethylene Glycol | 8. |
| Catalyst LC-5615 | 1. |
| Silicone L-5614 | 0.5 |
| Black | 0.05 |
| Aluminum trihydrate | 200. |
| Water | 0.2 |
| Isocyanate Bayer E-448 | 64. |

The process for applying the polyurethane coating is well known in the art, and is described in: Union Carbide U.S. Pat. Nos. 3,772,224, 3,849,156, 3,947,386, and 4,022,941; Dow Chemical U.S. Pat. Nos. 5,104,693 and 4,853,054; and, Bayer U.S. Pat. No. 4,035,529.

Example II

The carpet of example I was tufted using an open weave polypropylene "Action Bac" style 3870 from Amoco Fabrics and Fibers Company in place of the fiberglass.

Example III

The carpet of Example I was tufted using an open weave polyester fabric in place of the fiberglass.

The tensile and elongation properties of Example I, Example II and Example III are as follows:

|  | EXAMPLE I | EXAMPLE II | EXAMPLE III |
|---|---|---|---|
| Tensile--Warp, psi. | 405 | 158.3 | 359 |
| Elongation - warp | 6.0 | 17.11 | 25.7 |
| Tensile Fill psi | 375 | 118.8 | 346.2 |
| Elongation Fill | 5.5 | 17.11 | 25.2 |

A carpet was tufted at 32 ounces per square yard with a nylon fiber having a denier of 3750. The backing comprised a 12 foot wide "Poly Bac" Style 2200 From Amoco Fabrics and Fibers Company plus an open weave fabric of propylene style 3870 from Amoco Fabrics and Fibers Company. The carpet was tufted on a ⅛ gauge tufting machine. No shrinkage was measured.

The resulting carpet was back coated with a latex containing 125 parts calcium carbonate, at 32 ounces per square yard. During the backing process, the carpet shrank only ¼ inch, as opposed to 3 to 6 inches for normal carpet. Additionally, the carpet had a tuft bind of 22.4 pounds versus 17.6 pounds for the same carpet with a single primary backing.

From the foregoing it will be understood that the present invention provides a carpet having a superior dimensional stability from the time of tufting, through coating, and through installation and use. The carpet is not as severely affected by stress during coating, nor by heat during coating or curing. Even without the application of a secondary backing, the carpet of the present invention can be stretched into place, or can be glued down, without fear of stretch causing unsightly bulges.

It will of course be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

What is claimed as invention is:

1. A tufted carpet comprising:
    (a) a primary backing including:
        (i) a first backing formed of a woven or non-woven material, and
        (ii) a second backing having warp yarns and fill yarns with at least said warp yarns formed of a material stronger and less stretchable than said first backing, said second backing having an open weave,
    wherein said first backing and said second backing are contiguous with each other, with said first backing forming a first side of said primary backing and said second backing forming an opposite side of said primary backing;
    (b) a plurality of tufts of yarn sewn through said primary backing, said tufts of yarn:
        (i) being exposed on the first side of the primary backing for forming face yarns; and
        (ii) forming a plurality of back stitches on the opposite side of the primary backing;
    wherein at least a major portion of the back stitches secure said first backing to said second backing.

2. The tufted carpet of claim 1, wherein at least a major portion of said back stitches pass over said yarns of said second backing, holding said stitches away from said first backing, and wherein the carpet includes an adhesive encapsulating said stitches.

3. A tufted carpet comprising:
    (a) a primary backing including:
        (i) a first backing comprising a woven ribbon polypropylene; and
        (ii) a second backing comprising a leno weave or open weave material having warp yarns and fill yarns, with at least said warp yarns formed of a material stronger and less stretchable than said first backing;
    wherein the first backing and the second backing are contiguous with each other, with the first backing forming a first side of the primary backing and the second backing forming an opposite side of the primary backing;
    (b) a plurality of tufts of yarn sewn through said primary backing, said tufts of yarn:
        (i) being exposed on the first side of the primary backing for forming face yarns; and
        (ii) forming a plurality of back stitches on the opposite side of the primary backing;
    wherein at least a major portion of the back stitches secure the first backing to the second backing.

4. The tufted carpet of claim 3, wherein said warp yarns are selected from the group consisting of polypropylene, polyester, nylon, cotton, fiber glass, and combinations thereof.

5. The tufted carpet of claim 3, wherein said warp yarns are selected from the group consisting of ribbons and monofilaments, and said fill yarns are spun yarns.

6. The tufted carpet of claim 2, wherein said adhesive coats the entire opposite surface of said primary backing, and said adhesive is selected from the group consisting of polyurethane, latex, a hot melt adhesive, polyvinyl chloride, polyethylene and polypropylene.

7. The tufted carpet of claim 6, wherein a secondary backing is adhered to said adhesive, said secondary backing being selected from the group consisting of a woven fabric, a non-woven fabric, a tricot, a waterproof sheet material, and a foam layer.

8. A method for making a dimensionally stable tufted carpet, said tufted carpet comprising a primary backing having tufts of yarn sewn therein, said method comprising the steps of bringing together a first layer consisting of a woven or non-woven polypropylene material and a second layer consisting of an open weave material having greater strength and less stretchability than said first layer for forming a primary backing, feeding said primary backing through a tufting machine and sewing said tufts of yarn through both said layers for providing face yarns on said first layer and a back stitch on said second layer, and for securing said first layer and said second layer together.

9. A method as claimed in claim 8, and further including the step of back coating said tufted carpet for encapsulating said back stitch.

10. A method as claimed in claim 9, and including the step of applying a secondary backing against said back coating.

\* \* \* \* \*